July 9, 1935.  V. J. CHAPMAN  2,007,751
AUTOMATIC ARC WELDING
Filed Aug. 27, 1931
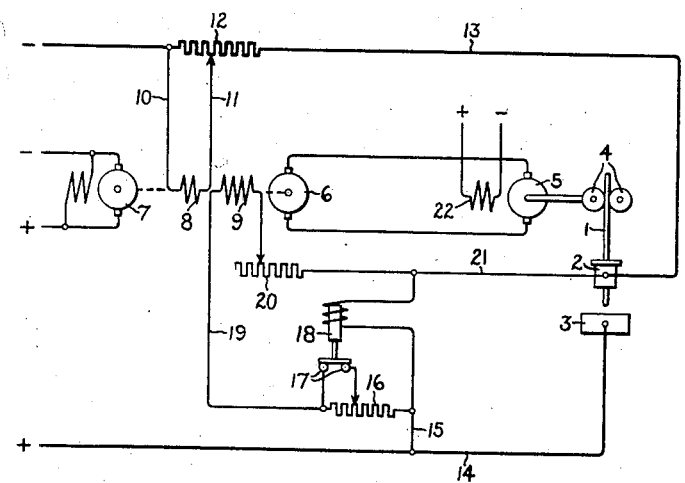
Inventor:
Verni J. Chapman,
by Charles E. Jullar.
His Attorney.

Patented July 9, 1935

2,007,751

UNITED STATES PATENT OFFICE 2,007,751

AUTOMATIC ARC WELDING

Verni J. Chapman, Schenectady, N. Y., assignor to General Electric Company, a corporation of New York Application August 27, 1931, Serial No. 559,763

2 Claims. (Cl. 219—8)

My invention relates to automatic arc welding apparatus, and more particularly to an improved control system for feeding a welding electrode toward and away from a co-operating electrode to strike and thereafter maintain a welding arc of substantially constant length and voltage.

It has already been proposed to employ an electrode feed motor whose armature is connected directly across the welding electrodes. Such a motor is necessarily of a special design since it is required to operate with impressed voltages of from 17 to 22 volts, the average voltage range of a metallic welding arc. Such a motor is of limited power and often proves unsuitable for feeding large sized electrodes, or for feeding average sized electrodes from large supply reels and/or through conduits by means of which the welding material is supplied to the electrode nozzle.

It is an object of my invention to provide a control system in which a motor designed for operation at voltages much greater than the voltage of a welding arc may be employed for feeding a welding electrode, and in which the speed and direction of rotation of the feed motor is controlled through the application of a variable voltage which is controlled in response to a characteristic of the welding arc.

Another object of my invention is to provide a simplified control system which is sufficiently powerful to feed electrode material under the most adverse conditions encountered in automatic arc welding practice.

My invention will be better understood from the following description taken in connection with the accompanying drawing which diagrammatically illustrates one embodiment thereof.

In the drawing, electrode 1 is fed through a nozzle member 2 toward and away from the work 3, constituting a cooperating electrode, by a feeding mechanism comprising feed rolls 4. This feeding mechanism is operated by a Ward Leonard system, the generator voltage of which is controlled in accordance with a characteristic of the welding arc. The Ward Leonard system comprises a separately excited motor 5 mechanically connected to the electrode feeding means and electrically connected to a variable voltage generator 6 which may be suitably driven by any appropriate mechanism, for example, a shunt motor 7. The generator 6 is provided with differential field windings 8 and 9. Field winding 8 is adjustably connected through conductors 10 and 11 across a resistance 12 inserted in the welding circuit 13, 14. This welding circuit may be connected to a constant potential source of supply in which case the resistor 12 will be the usual stabilizing resistor used in such circuits. However, if a variable voltage generator is used to supply the welding current the resistor 12 will merely constitute a shunt for the field winding 8 of the generator 6. Generator field winding 9 is connected across the welding electrodes 1 and 3 through conductors 14 and 15, resistance 16, contacts 17 of relay 18, conductor 19, adjustable resistance 20 and conductor 21. The operating coil of the relay 18 is connected across the arc and at voltages above the normal arcing voltage operates to insert all of the resistance 16 in series with the field 9 of the generator 6. During operating conditions, however, the relay is in the position illustrated in which it short circuits an adjustable portion of the resistance 16. The separately excited field winding 22 of the motor 5 and the shunt motor 7 may be connected to any suitable source of supply.

The operation and adjustment of the system is as follows:—Field 9 connected across the welding electrodes 1 and 3 operates to generate a voltage in the generator 6 suitable for rotating motor 5 in the proper direction for feeding the electrodes together. Before an arc has been established between these electrodes the full voltage of the welding source is applied to the electrodes, and this voltage is sufficient to operate relay 18, thereby inserting an additional portion of resistance 16 in series with the field winding 9. This decreases the excitation of generator 6 and the voltage applied to the motor 5 and causes it to operate at a reduced speed to feed the electrode 1 into engagement with its cooperating electrodes, the work 3. As soon as the electrodes engage one another the welding current flows, field winding 8 connected across the resistance 12 is fully excited, and field winding 9 is short circuited. As has been previously noted above, the winding 8 and 9 are differentially arranged and upon short circuiting of the welding circuit through contacts of the electrodes 1 and 3 field winding 8 predominates, reversing the voltage generated by the generator 6, and thereby reversing the rotation of the motor 5 to feed the electrode 1 away from the electrode 3 and strike the welding arc. As the arc is established and the excitation of the winding 9 gradually increases, the excitation of the winding 8 decreases. Eventually, the excitation of winding 9 predominates, reversing the voltage applied to the motor 5, which thereafter operates to feed the electrode 1 toward the electrode 3 in accordance with its consumption in the arc to maintain an arc of substantially constant length and voltage. The rate of feed will depend upon the combined action of the differential fields 8 and 9 which generate a variable voltage which causes the motor 5 to operate the feeding mechanism in the proper manner to accomplish this result. During the welding operation the relay 18 is in the position illustrated and its contacts short circuit a portion of the resistance 16 inserted in series with the winding 9 of generator 6.

It will be apparent that in the system illustrated and described the feed motor 6 may be designed for standard operating voltages and will be sufficiently powerful to feed electrode material under the most adverse conditions. The electrode material will most generally be a fusible metallic electrode, but the invention is not limited to such application since a non-consuming electrode such as carbon or tungsten may be used. The invention is also applicable to systems in which more than two electrodes are fed relatively to one another.

Thus, while I have shown and described a particular embodiment of my invention, such variations and modifications are contemplated as fall within the scope of my invention as set forth in the appended claims.

What I claim as new and desire to secure by Letters Patent of the United States, is:—

1. Arc welding apparatus comprising means for feeding an electrode toward and away from a cooperating electrode, means including a motor for operating said feeding means, a generator connected to said motor, means responsive to a characteristic of the welding arc for controlling the voltage of said generator and means responsive to the voltage across said electrodes for limiting the voltage of said generator to a predetermined value.

2. Automatic arc welding apparatus comprising means for feeding an electrode toward and away from a cooperating electrode, means including a motor for operating said feeding mechanism, a generator connected to said motor said generator having a field winding connected across said electrodes whereby said motor is operated to feed said electrode toward its cooperating electrode and a field connected to be responsive to welding current whereby said motor is operated to feed said electrode away from its cooperating electrode, and means responsive to voltages in excess of the arc voltage for decreasing the excitation of the field winding connected across said electrodes.

VERNI J. CHAPMAN.